United States Patent [19]
Rosenblad

[11] Patent Number: 5,840,159
[45] Date of Patent: Nov. 24, 1998

[54] MARINE EVAPORATOR FOR FRESH WATER PRODUCTION

[76] Inventor: Axel E. Rosenblad, 77 Bayside Dr., Atlantic Highlands, N.J. 07716

[21] Appl. No.: 724,603

[22] Filed: Sep. 30, 1996

[51] Int. Cl.$^6$ .......................................................... B01D 3/00
[52] U.S. Cl. ................................................................ 203/10
[58] Field of Search ................................................. 203/10

[56] References Cited

U.S. PATENT DOCUMENTS

| | | | |
|---|---|---|---|
| 4,810,327 | 3/1989 | Norrmen | 159/13.3 |
| 4,846,240 | 7/1989 | Erickson | 159/24.2 |
| 4,925,526 | 5/1990 | Havukainen | 159/13.3 |
| 4,944,839 | 7/1990 | Rosenblad | 159/13.1 |
| 5,232,557 | 8/1993 | Kontu et al. | 202/182 |

*Primary Examiner*—Edward J. Cain
*Attorney, Agent, or Firm*—Brooks Haidt Haffner & Delahunty

[57] ABSTRACT

A combined evaporator and condenser for desalination of seawater which can be used on a ship for fresh water production, has plate type falling film heat exchange elements within a housing wherein a liquid heating medium such as hot engine jacket water circulates within lower internal spaces of the heat exchange elements for boiling seawater falling as a film down external surfaces of the elements and vapor boiled off from the seawater is conducted to upper internal spaces within the heat exchange elements for condensation therein to produce a stream of fresh water. The seawater film flows down the entire length of the external surfaces of the plate heat exchange elements, which have a transverse internal partition separating their lower and upper internal spaces and vertical partitions within the lower internal spaces for lengthening the flow path of the liquid heat exchange medium therethrough.

19 Claims, 2 Drawing Sheets

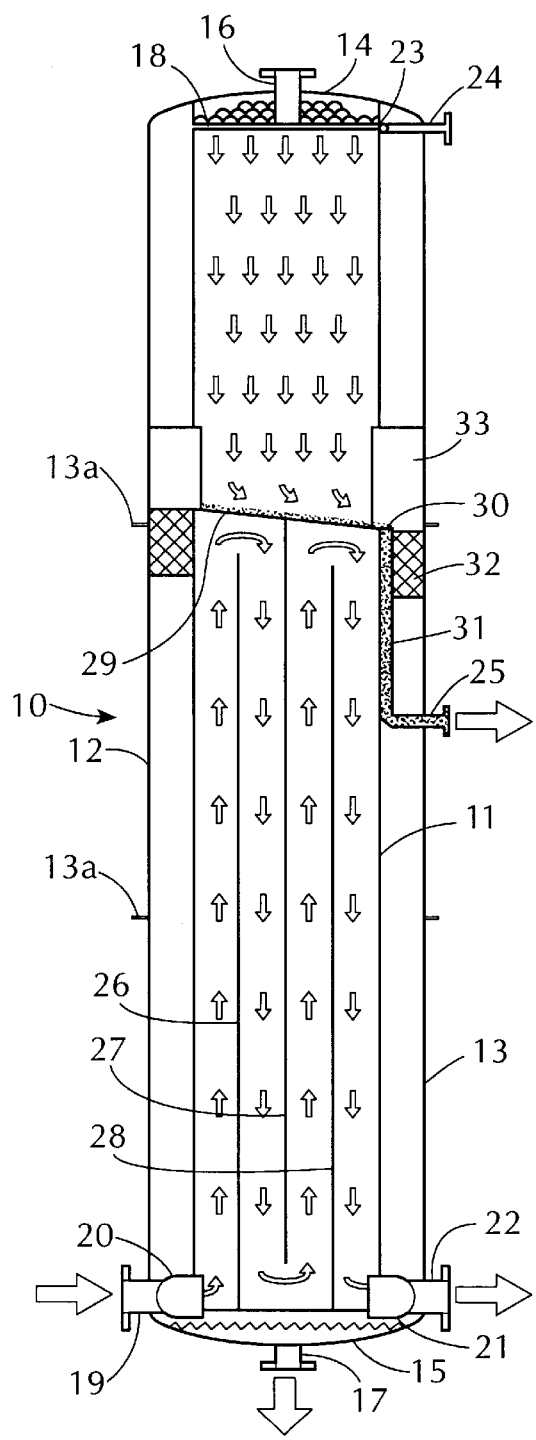
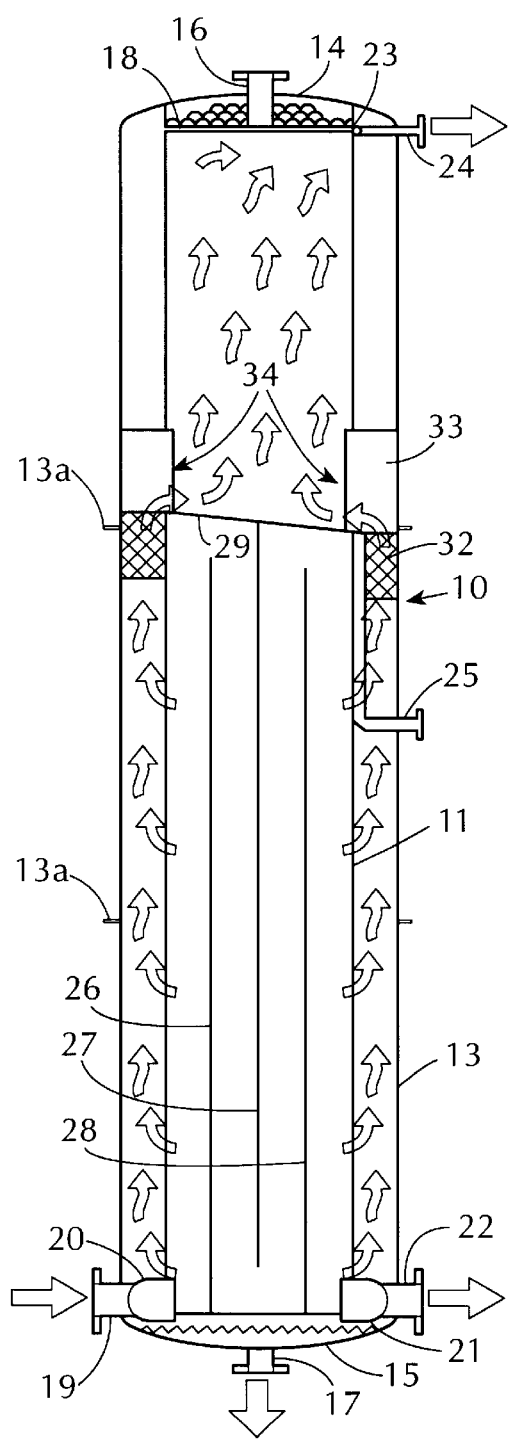
FIG. 1  FIG. 2

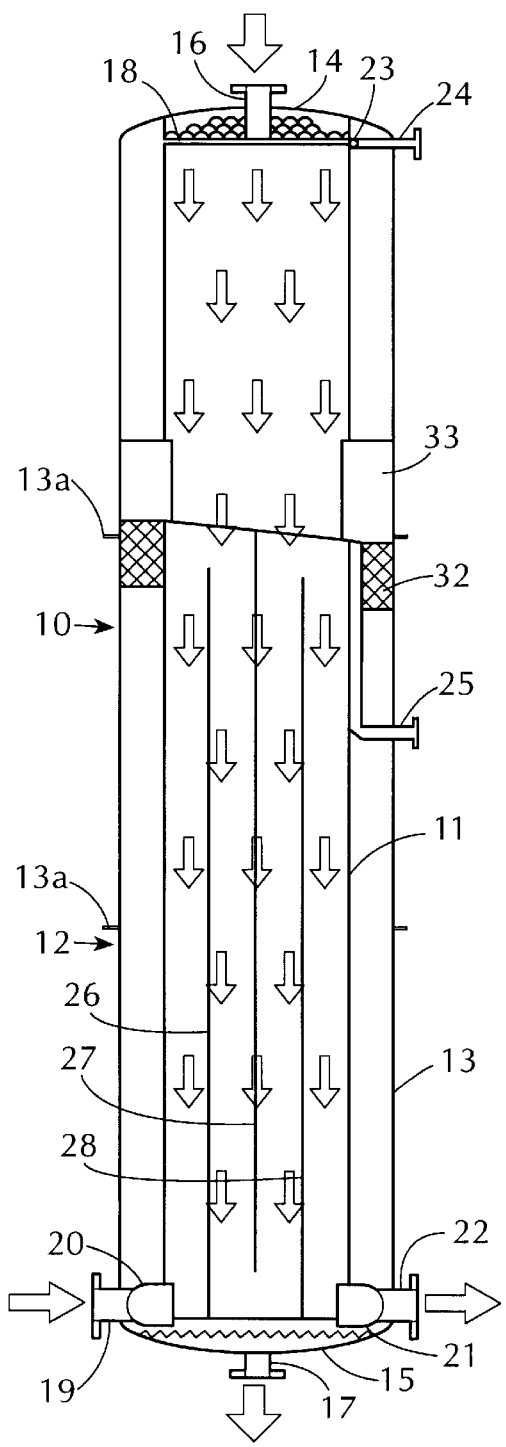
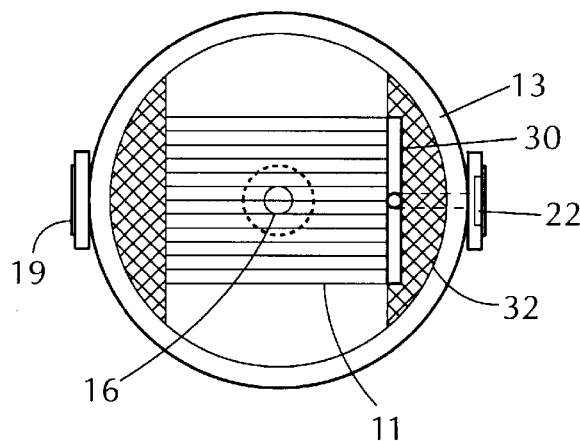
FIG. 4
FIG. 3

MARINE EVAPORATOR FOR FRESH WATER PRODUCTION

FIELD OF THE INVENTION

The invention relates to the removal of dissolved solids from water by evaporation, and more particularly to desalination of seawater and to a combined plate type falling film surface condenser and evaporator which can be used for shipboard seawater desalination.

DESCRIPTION OF RELATED ART

Falling film plate type heat exchangers in which coolant liquid to be evaporated falls down outer surfaces of heat exchange elements while heating vapor passes within the internal spaces between the plates of the heat exchange elements have been employed for such purposes as the concentration of pulp-cooking liquor, as shown, for example, in U.S. Pat. Nos. 3,351,119 and 3,371,709 and for condensation of vapors as shown in U.S. Pat. No. 4,216,002. A method for fabricating plate heat exchanger elements is shown in U.S. Pat. No. 3,512,239. Dimples formed in the plates of the heat exchange elements reinforce the structural strength of the elements.

The falling film plate type heat exchange elements of U.S. Pat. No. 4,878,532 are provided with an internal partition for discharging separate streams of condensate from within the elements. The internal partition extends across only part of the width of the element, leaving an open passage for vapor flow.

In the falling film evaporator of U.S. Pat. No. 4,944,839, top portions of only some of the plate heat exchange elements of a larger array of elements are enclosed within a hood. Non-condensible gases collect beneath the hood, preventing direct heat exchange between the falling film in the zone beneath the hood and condensible vapor. Since the non-condensible gases cannot heat the falling film significantly, the falling film within the hooded zone is preheated by indirect heat exchange with the heating medium within the plate elements.

Various devices have been used for desalination of seawater by evaporating the seawater to produce vapor which then condenses as water from which the salt has been removed.

Some known desalination devices use solar heating or other unreliable, inconvenient or expensive energy sources. The present invention provides an apparatus and method for producing fresh water in useful quantities by using the otherwise wasted heat of the jacket water of marine engines to evaporate seawater, more generally referred to herein as dissolved-solids-bearing water because the invention has broader applicability than the desalination of seawater, from which desalinated water is produced. The water employed as the heat source can then be discharged at lowered temperature.

SUMMARY OF THE INVENTION

The desalination apparatus of the invention employs modified plate type falling film heat exchange elements. A heating medium, which can be the hot water that has served as the coolant in the water jacket of a diesel or other marine engine, is fed into the interior of each of the plate type elements, and preferably is guided by internal partitions to follow a lengthened flow path so that the heating medium makes several passes within the interior of the element before exiting from the element for discharge to the environment or further use.

The heating medium is not permitted to pass all the way to the upper end of the heating element, because an internal partition or barrier, which can be a slanting seam joining the opposed plates of the element, prevents fluid from passing directly between lower and upper interior spaces within the element.

The term "seawater" is used throughout this specification because the invention is described in the context of removing salts from seawater, but it will be understood that the invention is capable of use in various applications including the removal of dissolved solids from dissolved-solids-bearing water.

Vapor derived from the boiling of the seawater passes upward within the interior upper space within each plate element, and condenses therein as a desalinated distillate which is discharged from the element above the internal partition for collection and use.

The water to be desalinated is distributed from above to fall as a thin film down the entire length of the outer surfaces of the plates of the plate type elements. The salt water first serves to cool and condense the vapor within the upper portions of the elements by indirect heat exchange, which preheats the water before the water film reaches the lower portion of the heating elements where the falling film is further heated by indirect heat exchange with the heating medium circulating within the lower part of the interior space within the element (e.g., hot engine jacket water).

The heat exchange at the lower parts of the elements evaporates some of the water that constitutes the falling film to form vapor which rises to be led into the interior spaces within the upper portions of the plate type elements for condensation therein to produce the distilled desalinated water which exits the apparatus as a stream of fresh water. Non-condensibles within the elements are vented near the tops of the plate type elements.

The plate type elements, which are ordinarily considerably taller than they are wide, can be compactly arranged as a parallel array, with the outer plate surfaces of successive elements spaced apart sufficiently to permit free flow of fluid therebetween, so as to constitute an element bundle or package that may be either rectangular or square in horizontal section. Simple plates corresponding in outline to the plate type elements can be used as outer package members and package components can be secured together for handling as a unit. All of plate type elements are enclosed within an upright generally cylindrical body or vessel. In shipboard use, the evaporator may be mounted by means of a simple mounting ring as a unit that penetrates a deck of a multi-deck ship. It is desirable, in shipboard installation, to locate the evaporator above the ship's fresh water tank so that the desalinated water can flow by gravity to the ship's fresh water tank, avoiding any need for pumping of the water.

BRIEF DESCRIPTION OF THE DRAWINGS

In the somewhat schematic views of the drawings:

FIG. 1 is a side view in section showing the flow of water within the interior of a representative plate type element according to the invention;

FIG. 2 a side view in section showing the flow of vapors boiled off from water in accordance with the invention;

FIG. 3 is a side view in section showing the flow of seawater (brine) during seawater desalination in accordance with the invention; and FIG. 4 is a view in cross-section taken along line 4—4 of FIG. 1 and looking in the direction of the arrows.

DETAILED DESCRIPTION OF PREFERRED EMBODIMENT

The evaporator for desalination of seawater in accordance with the invention, generally designated by the reference numeral 10 in the drawings, comprises a plurality of plate type heat exchange elements 11, each of which elements has two spaced, generally flat plates joined together at the plate peripheries, arranged within a shell or housing 12, which is preferably formed as an upright cylinder with a cylindrical side wall 13 and closed at the top and bottom by generally dome-shaped top and bottom end wall members 14 and 15. Annular external reinforcing ribs are shown at 13a. The plates of the elements 11 are preferably dimpled as shown, for example, in U.S. Pat. No. 3,512,939.

The housing 12 has a top inlet 16 through the top end member 14, shown as dome-shaped, and an outlet 17 through the bottom end member 15, also shown as dome-shaped. Brine, such as seawater to be desalinated, is introduced through the inlet 16, and is distributed by an apertured distribution tray 18 which can have a plurality of spaced perforations or the like for causing the seawater to drop on to the tops of the plate elements so as fall evenly downward over the entire length of outer surfaces of the plate elements 11 as a thin film. Brine, concentrated by the evaporation of some water therefrom, collects at the concave bottom 15, and exits through outlet 17 for disposal.

The several drawing figures also show a heating medium inlet 19 that passes through the housing wall 13, for the introduction of a heating medium to the interior spaces within the plate elements 11 via a transverse bottom inlet header 20 which interconnects and opens on to the internal space of each of the elements 11 and delivers the heating medium to the interior space of every element 11 of the group or bundle of plate elements. A transverse bottom outlet header 21 extends across and opens on to the interior space within each of the plate elements 11 at their side edges opposite the inlet header 20 for discharging the used heating medium via a bottom heating medium outlet 22 that passes through the housing side wall 13. The heating medium when the marine evaporator of the invention is used aboard ship is preferably the hot water that has served as coolant for the water jackets of ship engines. In other applications the hot water that serves as heating medium can come from some other available hot water source, or some other hot liquid or vapor can be used as heating medium, since the heating medium does not come into direct contact with the water that is undergoing desalination.

The interior spaces within the upper portions of the plate elements 11 are interconnected near the tops of the elements 11 by a transversely extending top header 23 for the exit of non-condensible gases from within the elements 11 via a non-condensible outlet pipe 24 which passes through the side wall 13 of the housing.

The outlet from the housing 12 for desalinated water condensed from water vapor within the upper interior spaces within the plate elements 11 is shown at 25. This distillate can be directed through a suitable conduit to the fresh water tank of the ship for collection therein.

While the present detailed description is directed toward the use of the invention for shipboard seawater desalination, the apparatus and method of the invention can be used advantageously for other applications, such as the demineralization of water generally and for the removal of undesired dissolved substances from liquids other than salt water.

Fluid flow within the plate-type heat exchange elements 11 of the preferred embodiment of the invention is directed by internal partitions formed within the elements 11. These partitions are preferably provided by seams formed by simply welding together the two plates which constitute the walls of the element 11 along lines. Thus, at their lower portions, the elements have internal partitions shown in FIGS. 1–3 as essentially vertical seams 26, 27 and 28. The partitions 26 and 28 extend upward from the bottom end of the element 11 and the partition 27 extends essentially downward from a transverse partition 29, but the partition 27 does not reach the bottom edge of the element 11. The lower end of the partition 27 is spaced from the bottom of the plate 11 as shown in FIGS. 1–3.

The arrangement of the internal partitions 26–29 directs the liquid heating medium such as hot engine jacket water to make four passes through the lower interior space within the element as the heating medium travels from the inlet header 20 to the outlet header 21 as shown in FIG. 1. The four pass arrangement shown in FIGS. 1–3 has been found to be suitable for maintaining a good flow velocity of the heating medium through the interiors of the elements 11 for indirect transfer of heat from the heating medium to the salt water flowing down the lower outer surfaces of the heat exchange plate elements 11. The number of passes of the heating medium through the lower portions of the elements 11 can, of course, be selected, by providing a different number of essentially vertical partitions like the partitions 26–28 illustrated for directing the flow through the desired number of passes. Alternatively, the heating medium could be directed to make generally horizontal passes through the lower interior element space, but the vertical arrangement as shown is preferred.

Heating liquid flowing through the lower internal spaces is prevented from entering the upper internal spaces within the elements 11 by the transverse partition 29, which can also be formed as a welded seam joining the opposed plates of the element 11. The transverse partition 29 is shown as slanted at a small angle, say 5–15 degrees, with respect to the horizontal so that desalinated water produced above the partition 29 within the upper interior spaces of the element 11 flows downwardly to a basin 30 opening on to the interior spaces of all of the elements 11 as shown in FIGS. 1–4. From the basin 30 the fresh water distillate flows down via an outlet pipe 31 to the desalinated water outlet 25 as best seen in FIG. 1, which can be connected by a suitable conduit to a fresh water storage tank. Most of the surface of the heating elements 11 is below the transverse partition 29. For example, about two-thirds of the surface can be used for evaporation below the partition 29 which the remaining one-third is employed for vapor condensing. In a presently particularly preferred embodiment the surface is split into lower and upper areas of 62 and 38 percent, respectively.

As shown in FIGS. 1–3, the partition 26 is preferably somewhat higher than the partition 28, generally in correspondence with the slope of the transverse partition 29 spaced substantially equal distances from the upper ends of the partitions 26 and 28 so that the flow path for heating fluid passing over the upper ends of the partitions 26 and 28 remains essentially constant in cross-sectional area to maintain an even pressure distribution.

FIGS. 1–3 and especially FIG. 2 which shows the essentially upward flow of vapor generated during operation of the combined evaporator of the invention, also show the mist or drift eliminator 32 that occupies and fills the gap between the inner wall of the housing or shell 12 and the space occupied by the heat exchange elements 11, defining upper and lower zones within the housing 12. The mist or drift eliminator 32 can preferably be an entrainment separator of known mesh pad or vane type. A mesh pad structure formed of a suitable elastomer can serve as the mist or drift eliminator for preventing any liquid droplets entrained by the rising vapor from being carried further upward by the upwardly flowing vapor. The entrainment separator 32 is located outside the elements 11 and immediately below the line defined by the outer edge of the transverse partition 29, and directly above the entrainment separator 32 there is a vapor-directing conduit 33 that interconnects the heat exchange elements 11 above the transverse partition 29.

The conduit 33, which can be generally rectangular in cross-section, opens on to the interiors of all of the elements 28 above the transverse partition 29 and is open at 34 to the flow of vapor that has passed upward through the entrainment separator 32. The rising vapor is directed via the conduit 33 into the upper interior spaces of the elements 11 above the transverse partition 29 as shown in FIG. 2. The vapor that has been generated by evaporation below the level of the transverse partition 29 is thus caused to flow within the upper portions of the elements 11, to serve as the heating medium for indirect heat exchange with the water falling as a thin film down the exterior of the plate heat exchange elements at their upper parts. This upper zone of the combined evaporator 10 can thus be seen to operate as a preheater for the seawater to be desalinated by distillation as the seawater falls down the outside of the elements 11, as illustrated in FIG. 2, whereas the upper interior spaces within the heat exchange elements 11 operate as a condenser for the vapor generated by evaporation of the seawater, as illustrated in FIG. 1.

The upper zone within the housing wherein the seawater serves to cool the upper portions of the elements 11, causing condensation of vapor therein, contains an inert atmosphere which cannot heat the seawater to any significant extent by direct heat exchange therewith. The rising vapor has been directed into the elements 11 above the partition 29 via the conduit 33, preventing direct contact heating of the seawater by the rising vapor, and accordingly preventing direct heat exchange between the vapors and the incoming seawater.

The operation of the marine evaporator is illustrated by the following discussion of the operation of a shipboard seawater desalination apparatus in accordance with the invention.

An evaporator 10 with 13 plate-type heat exchange elements 11 spaced apart on 1¼ inch centers, each element 10 being 14 feet tall and 20 inches wide, produces about 4 gallons per minute of fresh water from a feed of about 50 gallons per minute of seawater introduced at a temperature of 85° F. through the inlet 16, which has a diameter of 2 inches. The fresh water outlet 25, through which the somewhat concentrated brine exits at a temperature of about 170° F., is 1 inch in diameter.

Hot water that has been used as the cooling water for the ship's engine jacket enters the inlet 19 at a temperature of 190° F. and at a flow rate of 250 gallons per minute. After passing through the header 20 and through the lower interior spaces within the elements 11, directed by the partitions 26–29, the heating water exists via the header 21 and outlet 22 at a temperature of 175° F. The inlet 19 and outlet 22 are pipes 4 inches in diameter. Non-condensible gases are drawn from within the upper interior spaces within the elements 11 through the outlet pipe 24 at a rate of 2 pounds per hour by a vacuum pump (not shown), which can advantageously be the only pump employed by the system.

The total weight of the apparatus 10 is about 2,000 pounds, if the shell 12 is 10 gauge thick steel and the plate elements 11 are formed of 20 BWG (Birmingham wire gauge) steel.

Instead of the cylindrical housing 11 shown, a rectangular or square housing can be employed, and the overall size of the apparatus can be larger or smaller than that of the illustrative embodiment discussed in detail in the foregoing example. If required or desired, larger diameter and wider elements 11 can be used for greater flow rates, and the number of elements 11 can be greater or less. Cost economies can be achieved by increasing the relative height to width of the elements 11. Special corrosion resistant structural materials can be employed for a given application, and various other adaptations and modifications will suggest themselves to those skilled in the art.

What is claimed is:

1. A dissolved-solids-bearing water evaporator for producing fresh water by evaporation of dissolved-solids-bearing water and condensation of vapor generated by such evaporation to produce a stream of fresh water, comprising, in combination: a housing having a dissolved-solids-bearing water inlet and a dissolved-solids-bearing water outlet; a plurality of plate heat exchange elements within the housing, each plate element having a lower internal space, means for introducing a heating medium into the lower internal space and means for discharging the heating medium from the lower internal space, means for introducing vapor derived from the evaporation of dissolved-solids-bearing water within the housing into an upper internal space and means for discharging fresh water from within the upper internal space, said upper and lower internal spaces being separated by a transverse partition; and entrainment separator means for preventing water entrained by vapor derived from the evaporation of dissolved-solids-bearing water from entering the upper internal space.

2. The dissolved-solids-bearing water evaporator of claim 1 wherein the lower internal space has one or more partitions for lengthening the flow path of heating medium through the from the means for introducing the heating medium through the lower internal space to the means for discharging heating medium.

3. The dissolved-solids-bearing water evaporator of claim 2 wherein there are three substantially vertical partitions for directing the heating medium to make four passes within the lower internal space.

4. The dissolved-solids-bearing water evaporator of claim 1, including means above the plate heat exchange elements for distributing dissolved-solids-bearing water so that the dissolved-solids-bearing water falls down exterior surfaces of the plate elements as a film.

5. The dissolved-solids-bearing water evaporator of claim 4 wherein the means for distributing dissolved-solids-bearing water comprises an apertured tray.

6. The dissolved-solids-bearing water evaporator of claim 1, including means for conducting non-condensed vapor out of the upper internal space.

7. The dissolved-solids-bearing water evaporator of claim 1 wherein the housing is shaped as an upright cylinder with a dome-shaped bottom end member for collecting dissolved-solids-bearing water at the bottom of the housing.

8. The dissolved-solids-bearing water evaporator of claim 1 wherein the transverse partition is slanted at an angle with respect to the horizontal for directing a flow of fresh water to the fresh water discharging means.

9. The apparatus of claim 1 wherein the means for introducing and discharging the heating medium comprise headers opening on to the lower internal space of each of the plate heat exchange elements near the bottom of the plate heat exchange element.

10. The dissolved-solids-bearing water evaporator of claim 1 wherein the means for introducing vapor derived from the evaporation of dissolved-solids-bearing water into the upper internal space is a conduit opening onto the upper internal space of each of the plate heat exchange elements, the conduit being positioned directly above the entrainment means.

11. A method for evaporation of dissolved-solids-bearing water and condensing vapor derived from such evaporation comprising introducing the dissolved-solids-bearing water at the top of a housing and causing the dissolved-solids-bearing water to fall as a film over external surfaces of plate heat exchange elements within the housing before exiting from the bottom of the housing after some of the dissolved-solids-bearing water has evaporated while falling down the external surfaces; introducing a liquid heating medium into a lower internal space within each of the plate heat exchange elements for evaporating falling dissolved-solids-bearing water by indirect heat exchange with the dissolved-solids-bearing water and discharging the liquid heating medium from the lower internal space; causing vapor derived from the evaporation of the dissolved-solids-bearing water to pass into an upper internal space within each of the plate heat exchange elements for condensation of vapor therein by indirect heat exchange with dissolved-solids-bearing water falling over the external surfaces of the plate heat exchange elements and discharging condensate from within the upper internal space as a stream of fresh water.

12. The method of claim 11 and including preventing liquid entrained by vapor derived from evaporation of dissolved-solids-bearing water from entering the upper internal space within the plate heat exchange elements.

13. The method of claim 11 wherein the liquid heating medium is hot water and including heating the hot water by using the water for cooling an engine before introducing the water into the lower internal space.

14. The method of claim 11, including lengthening the flow path of the liquid heating medium by directing the liquid heating medium past partition means within the lower internal space.

15. The method of claim 14, including directing the liquid medium past substantially vertical partition means to flow upwards and downwards within the lower internal space.

16. The method of claim 11, including separating the lower and upper internal spaces by a transverse partition within each of the plate heat exchange elements and using the transverse partition to direct fresh water out of the upper internal space.

17. The method of claim 11, including pumping non-condensed vapor out of the upper internal space.

18. The method of claim 11, including distributing dissolved-solids-bearing water to the external surfaces of the plate heat exchange elements by means of a dissolved-solids-bearing water distribution tray located above the plate heat exchange elements within the housing.

19. The method of claim 11, including conducting the fresh water from the evaporator to a fresh water storage tank.

* * * * *

UNITED STATES PATENT AND TRADEMARK OFFICE
CERTIFICATE OF CORRECTION

PATENT NO. : 5,840,159

DATED : November 24, 1998

INVENTOR(S) : Axel E. Rosenblad

It is certified that error appears in the above-identified patent and that said Letters Patent is hereby corrected as shown below:

Column 4, line 51, change numbers "62 and 38" bold appearance to regular appearance.

Signed and Sealed this

Twenty-fifth Day of May, 1999

Attest:

Q. TODD DICKINSON

Attesting Officer

Acting Commissioner of Patents and Trademarks